United States Patent [19]
Harris

[11] Patent Number: 6,144,949
[45] Date of Patent: Nov. 7, 2000

[54] RADIO FREQUENCY COMMUNICATION SYSTEM WITH SUBSCRIBERS ARRANGED TO AUTHENTICATE A RECEIVED MESSAGE

[75] Inventor: Michael Gilbert Harris, Evanston, Ill.

[73] Assignee: Motorola, Inc., Schaumburg, Ill.

[21] Appl. No.: 09/023,142

[22] Filed: Feb. 12, 1998

[51] Int. Cl.[7] ................................................. G06F 15/163

[52] U.S. Cl. ................... 705/38; 705/30; 705/35; 705/1; 705/20; 705/23

[58] Field of Search ..................................... 705/1, 20, 23, 705/30, 35, 38

[56] References Cited

U.S. PATENT DOCUMENTS 5,850,444  12/1998  Rune ........................................... 380/21

*Primary Examiner*—Thomas R. Peeso
*Attorney, Agent, or Firm*—Wayne J. Egan; Susan L. Lukasik

[57] ABSTRACT

A radio frequency communication system subscriber (110) has a unique identification code, public key and private key, and stores the identification code and public key for other system subscribers in its memory (115). When transmitting, the subscriber includes its identification code in a transmitted message (160) and encodes the transmitted message with its private key. When receiving, the subscriber authenticates a received message (170) by accessing the sending subscriber (120)'s identification code from the message, retrieving the sending subscriber's public key from memory and decoding the message with the retrieved key.

16 Claims, 4 Drawing Sheets

RADIO FREQUENCY COMMUNICATION SYSTEM WITH SUBSCRIBERS ARRANGED TO AUTHENTICATE A RECEIVED MESSAGE

FIELD OF THE INVENTION

This application relates to radio frequency communication systems including, but not limited to, a radio frequency communication system with subscribers arranged to authenticate a received message.

BACKGROUND OF THE INVENTION

In current radio frequency communication systems, a subscriber can be programmed to clone an authorized radio and thereby gain access to the system. Also, in a conventional mode, one subscriber cannot verify the identity of another.

Therefore, there is a need for a radio frequency communication system with subscribers arranged to authenticate a received message, as such a system would prevent unauthorized system access in a trunked mode, and would provide a method for one subscriber to authenticate another in a conventional mode.

DESCRIPTION OF THE PREFERRED EMBODIMENT

Figure 1:
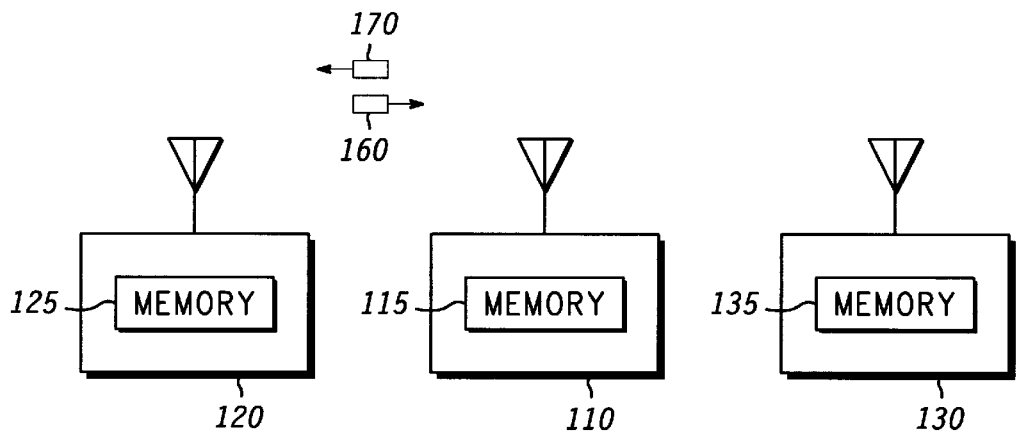
FIG. 1 is a block diagram of a radio frequency communication system 100, either trunked or conventional, the system including a subscriber 110, the subscriber being arranged to authenticate a received message, in accordance with the present invention.

Briefly, in a trunked or conventional radio frequency communication system, a subscriber has a unique identification code ("ID"), public key, private key and a subscriber memory, and is arranged for storing the identification codes and corresponding public keys for other system subscribers in the subscriber memory. When transmitting, the subscriber includes its identification code in a transmitted message and encodes the transmitted message with its private key.

When receiving a message from a sending subscriber, the subscriber authenticates the received message by accessing the identification code of the sending subscriber (the "sending subscriber's identification code") from the message, retrieving the corresponding public key of the sending subscriber (the "sending subscriber's public key") from the subscriber memory and decoding the received message with the retrieved sending subscriber's public key.

When the received message also includes an identification code and public key of a third subscriber (the "third subscriber's identification code and public key"), the subscriber builds the subscriber memory by accessing the third subscriber's identification code and public key from the received message and then storing the third subscriber's identification code and public key in the subscriber memory.

In a trunked system, a trunked system infrastructure has an infrastructure memory, and is arranged for storing the identification codes and corresponding public keys for system subscribers in the infrastructure memory. When receiving a message from a sending subscriber, the trunked system infrastructure authenticates the received message by accessing the sending subscriber's identification code from the received message, retrieving the sending subscriber's public key from the infrastructure memory and decoding the received message with the retrieved sending subscriber's public key.

When the message received by the trunked system infrastructure is a channel request from a requesting subscriber, the infrastructure sends a channel grant message that includes the identification code and public key of the requesting subscriber (the "requesting subscriber's identification code and public key") to all system subscribers. Upon receiving the channel grant message, other system subscribers build their subscriber memories by accessing the requesting subscriber's identification code and public key from the received channel grant message and then storing the requesting subscriber's identification code and public key in memory.

When the trunked system infrastructure receives a message from a first subscriber, and when the received message includes the identification code and public key of a second subscriber (the "second subscriber's identification code and public key"), the trunked system infrastructure builds the infrastructure memory by accessing the second subscriber's identification code and public key from the received message and then storing the second subscriber's identification code and public key in the infrastructure memory.

Referring now to FIG. 1, there is shown a radio frequency communication system 100, the radio frequency communication system having a plurality of subscribers 110, 120 and 130, each subscriber arranged in accordance with the invention. Each subscriber of the plurality of subscribers has a unique identification code, public key and private key. As shown, each subscriber 110, 120, 130 includes a corresponding subscriber memory 115, 125, 135 and is arranged for storing identification codes and public keys for various system subscribers in its subscriber memory.

Each subscriber is arranged for sending a transmitted message to a receiving subscriber by including its identification code in the transmitted message and encoding the transmitted message with its private key.

Each subscriber is further arranged for receiving a message from a sending subscriber, thus forming a received message, the received message including the sending subscriber's identification code.

In FIG. 1, the subscriber 120 is depicted as a sending subscriber that sends a first transmitted message 160 to the subscriber 110, which thereupon acts as a receiving subscriber. In turn, the subscriber 110 is also depicted as a sending subscriber that sends a second transmitted message 170 to the subscriber 120, which thereupon acts as a receiving subscriber.

In accordance with the present invention, each subscriber is arranged for receiving a message from a sending subscriber, thus forming a received message, the received message including the sending subscriber's identification code, and for authenticating the received message by accessing the sending subscriber's identification code from the received message, retrieving the sending subscriber's public key from the subscriber memory, thus forming a retrieved key, and decoding the received message with the retrieved key.

Figure 3:
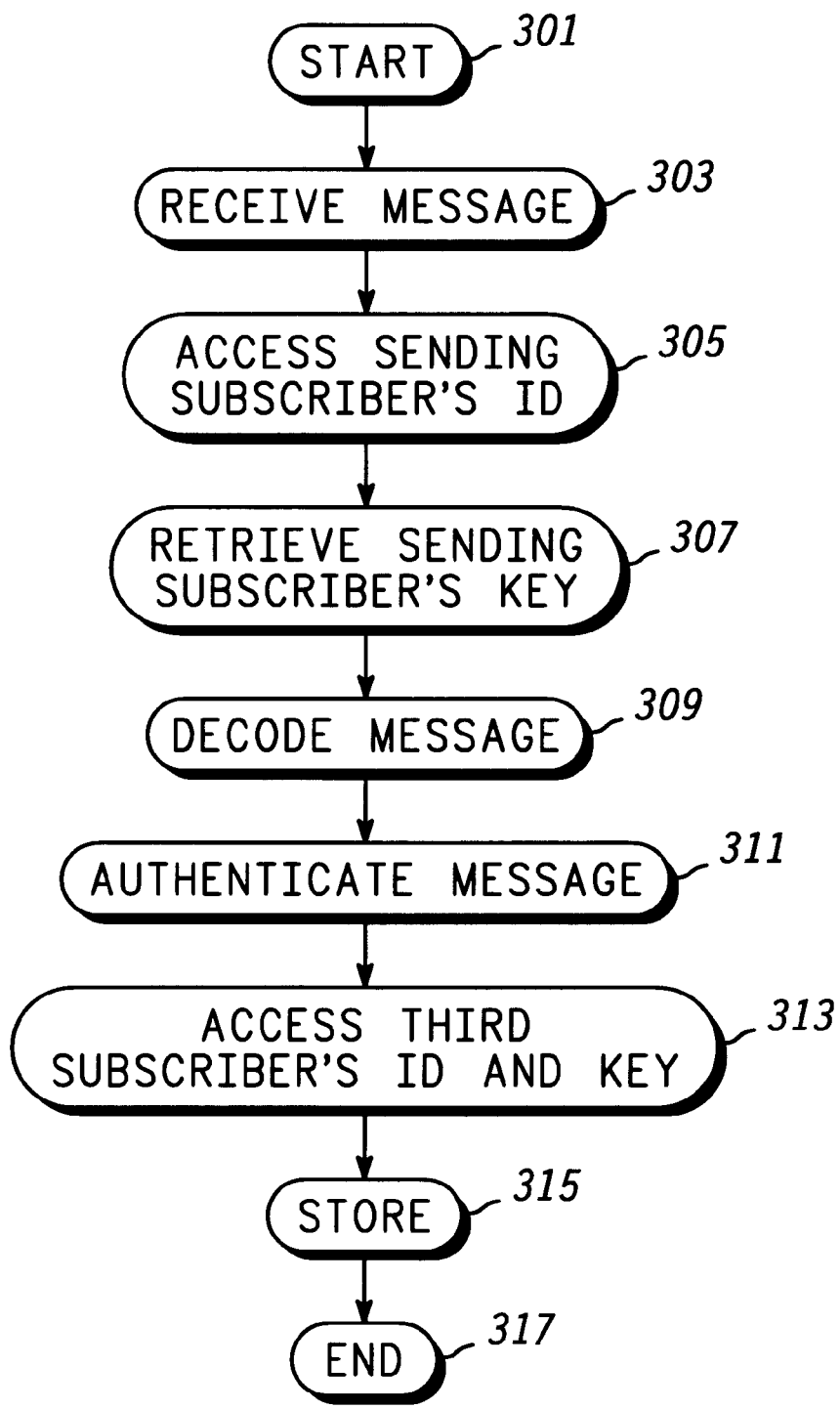
FIG. 3 is a first flow diagram for the subscriber 110.

Referring now to FIG. 3, there is shown a first flow diagram for a typical subscriber of the plurality of subscribers 110, 120 and 130 say, for example, subscriber 110. As described below, FIG. 3 depicts the process of the subscriber 110 receiving a message, authenticating the received message, and building its subscriber memory.

The process starts, step 301, and then proceeds to step 303.

In step 303, the subscriber 110 receives a message (depicted as element 160 in FIG. 1) from a sending subscriber (depicted as the subscriber 120 in FIG. 1), thus forming a received message, the received message including the sending subscriber 120's identification code and being encoded with the sending subscriber 120's private key.

Next, the subscriber authenticates the received message by the sequence of steps 305, 307, 309 and 311.

In step 305, the subscriber 110 accesses the sending subscriber 120's identification code from the received message.

In step 307, the subscriber 110 retrieves the sending subscriber 120's public key from its subscriber memory 115, thus forming a retrieved key.

In step 309, the subscriber 110 decodes the received message 160 with the retrieved key of step 307.

In step 311, the subscriber 110 authenticates the received message 160 by determining, based on the success or failure of the decoding step 309, whether the received message 160 was actually sent by the subscriber 120.

In one embodiment, the received message includes a third subscriber's identification code and public key. In this case, the subscriber is further arranged for building its subscriber memory by accessing the third subscriber's identification code and public key from the received message and storing the third subscriber's identification code and public key in the subscriber memory.

For example, the third subscriber may be the subscriber 130. In this case, the received message 160 includes the subscriber 130's identification code and public key.

FIG. 3 depicts the process of the subscriber 110 building its subscriber memory 115 by the sequence of steps 313 and 315.

In step 313, the subscriber 110 accesses the third subscriber's identification code and public key from the received message 160.

In step 315, the subscriber 110 stores the third subscriber's identification code and public key in its subscriber memory 115.

The process ends, step 317.

In one embodiment, the radio frequency communication system 100 is a conventional system.

In an alternate embodiment, the radio frequency communication system 100 is a trunked system.

Figure 2:
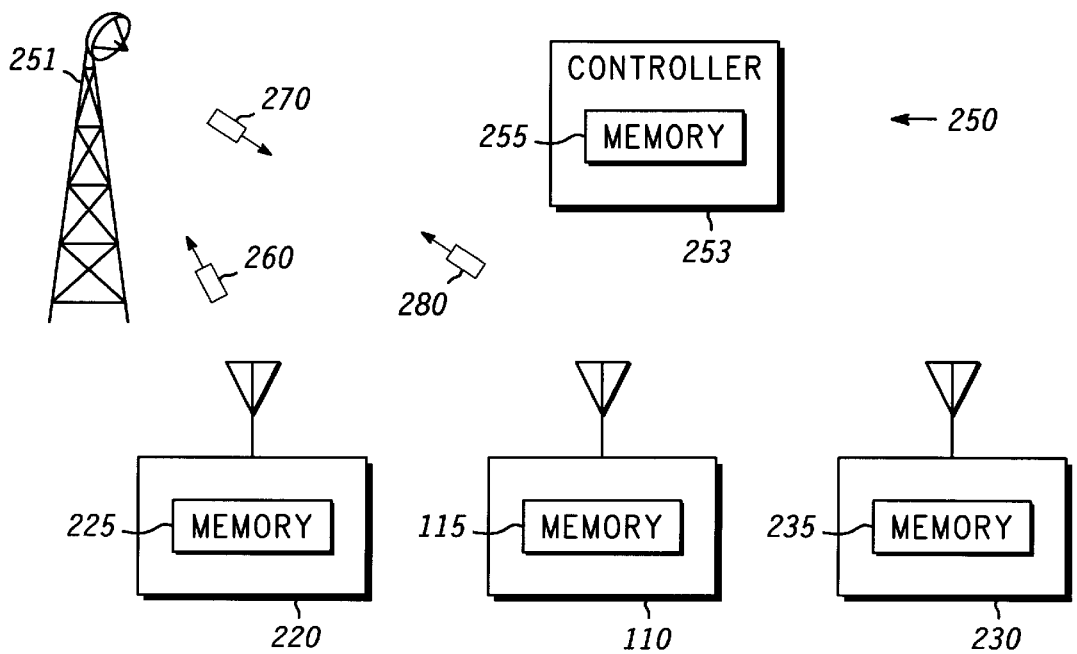
FIG. 2 is a block diagram of a trunked radio frequency communication system 200, the system including a trunked system infrastructure 250 and the subscriber 110.

Referring now to FIG. 2, there is shown a trunked radio frequency communication system 200 including a trunked system infrastructure 250 and a plurality of subscribers 110, 220 and 230, each subscriber of the plurality of subscribers having a unique identification code, public key, private key and a corresponding subscriber memory 115, 225 and 235. It is noted the subscriber 110 is the identical subscriber 110 of FIG. 1.

As shown, the trunked system infrastructure 250 is arranged to function with the trunked radio frequency communication system 200. The infrastructure 250 includes a base station 251 and a controller 253, the controller 253 including an infrastructure memory 255. Moreover, the infrastructure 250 is arranged for storing identification codes and public keys for various subscribers of the plurality of subscribers in the infrastructure memory 255.

As shown, each subscriber 110, 220 and 230 is arranged for sending a channel request to the infrastructure 250 by including its identification code in the channel request and encoding the channel request with its private key.

As shown, the trunked system infrastructure 250 is arranged for receiving a channel request from a requesting subscriber of the plurality of subscribers, thus forming a received channel request, the received channel request including the requesting subscriber's identification code, and for authenticating the received channel request by accessing the requesting subscriber's identification code from the received channel request, retrieving the requesting subscriber's public key from the infrastructure memory, thus forming a retrieved key, and decoding the received channel request with the retrieved key.

As shown, the trunked system infrastructure 250 is further arranged, in response to authenticating the received channel request, for sending a channel grant message to the plurality of subscribers, the channel grant message including the requesting subscriber's identification code and public key.

In FIG. 2, for example, the infrastructure 250 is depicted as receiving a channel request 260 from a requesting subscriber 220, the channel request 260 including the requesting subscriber 220's identification code and being encoded by the requesting subscriber 220's private key. Further, in response to receiving and authenticating this channel request 260, the infrastructure 250 is further depicted as sending a channel grant message 270 to the plurality of subscribers 110, 220 and 230, the channel grant message 270 including the requesting subscriber 220's identification code and public key.

Figure 4:
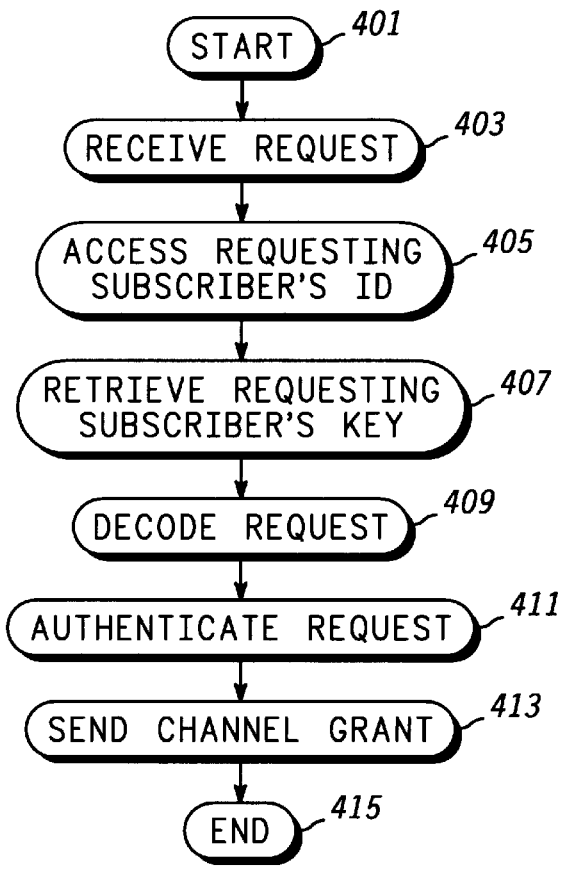
FIG. 4 is a first flow diagram for the trunked system infrastructure 250.

Referring now to FIG. 4, there is depicted the process of the infrastructure 250 receiving a channel request, authenticating the received channel request, and sending a channel grant message.

The process starts in step 401 and then proceeds to step 403.

In step 403, the infrastructure receives a channel request 260 from a requesting subscriber 220, thus forming a received channel request, the received channel request including the requesting subscriber 220's identification code and being encoded with the requesting subscriber 220's private key.

Next, the infrastructure 250 authenticates the received channel request by the sequence of steps 405, 407, 409 and 411.

In step 405, the infrastructure accesses the requesting subscriber 220's identification code from the received channel request.

In step 407, the infrastructure retrieves the requesting subscriber 220's public key from its infrastructure memory, thus forming a retrieved key.

In step 409, the infrastructure decodes the received channel request with the retrieved key of step 407.

In step 411, the infrastructure authenticates the received channel request by determining, based on the success or failure of the decoding step 409, whether the received channel request was actually sent by the subscriber 220.

In step 413, the infrastructure sends a channel grant message 270 to the plurality of subscribers 110, 220 and 230, the channel grant message including the requesting subscriber 220's identification code and public key.

The process ends, step 415.

Referring again to FIG. 2, in the trunked radio frequency communication system 200, each subscriber 110, 220 and 230 of the plurality of subscribers is arranged for receiving a channel grant message from the trunked system infrastructure 250, thus forming a received channel grant message, the received channel grant message including a requesting subscriber's identification code and public key. Moreover, each subscriber is further arranged for building its corresponding subscriber memory 115, 225 and 235 by accessing the requesting subscriber's identification code and public key from the received channel grant message and storing the requesting subscriber's identification code and public key in its subscriber memory.

Thus, with respect to the subscriber 110 in the above example, the subscriber receives the channel grant message 270, thus forming a received channel grant message. The subscriber 110 then builds its subscriber memory 115 by accessing the requesting subscriber 220's identification code and public key from the received channel grant message and storing the requesting subscriber 220's identification code and public key in its subscriber memory 115.

Figure 5:
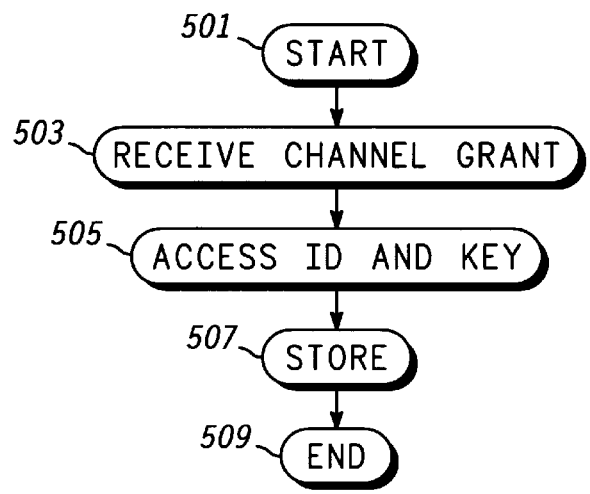
FIG. 5 is a second flow diagram for the subscriber 110.

Referring now to FIG. 5, there is depicted the process of the subscriber 110 receiving a channel grant message, and building its subscriber memory.

The process starts, step 501, and then proceeds to step 503.

In step 503, the subscriber 110 receives the channel grant message 270, thus forming a received channel grant message.

Next, the subscriber builds its subscriber memory 115 by the sequence of steps 505 and 507.

In step 505, the subscriber accesses the requesting subscriber's identification code and public key from the received channel grant message.

In step 507, the subscriber stores the requesting subscriber's identification code and public key in its subscriber memory 115.

The process ends, step 509.

Returning again to FIG. 2, the infrastructure is further arranged for receiving a message from a first subscriber of the plurality of subscribers 110, 220 and 230, thus forming a received message. Thereupon, the infrastructure is further arranged to authenticate the received message by a process similar to the infrastructure's process of authenticating a received channel request described above in the sequence of steps 405, 407, 409 and 411. After authentication, the infrastructure takes further action based on the contents of the received message. In one embodiment, for example, the message includes a second subscriber's identification code and public key. In this case, the infrastructure is arranged for building its infrastructure memory by accessing the second subscriber's identification code and public key from the received message and storing the second subscriber's identification code and public key in the infrastructure memory.

Thus, in FIG. 2 the infrastructure 250 is depicted as receiving a message 280 from the subscriber 110 ("the first subscriber"), thus forming a received message, the received message including the identification code and public key of the subscriber 230 ("the second subscriber"). After authenticating the received message, the infrastructure builds its infrastructure memory 255 by accessing the subscriber 230's identification code and public key from the received message, and storing the subscriber 230's identification code and public key in the infrastructure memory 255.

Figure 6:
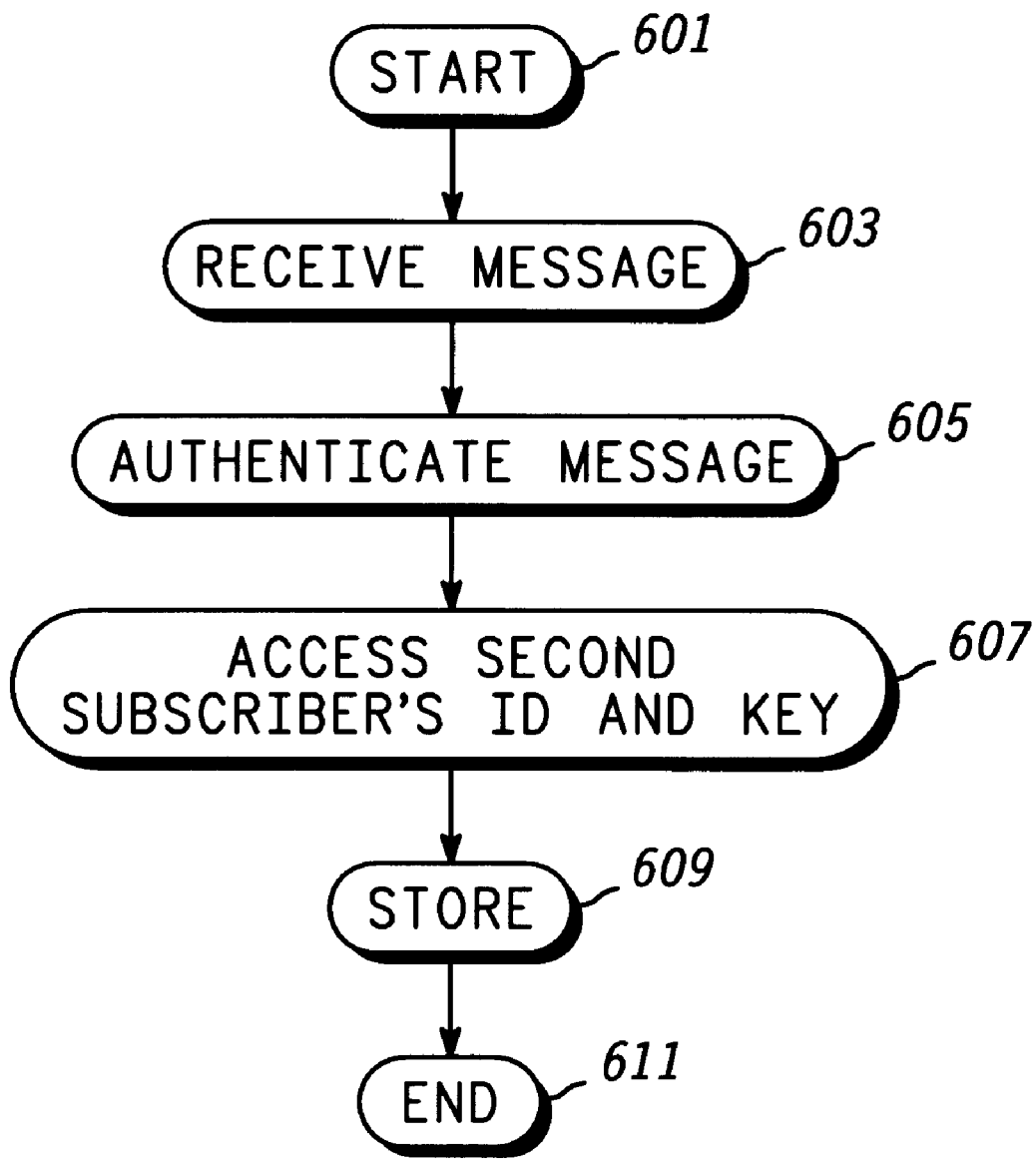
FIG. 6 is a second flow diagram for the trunked system infrastructure 250.

Referring now to FIG. 6, there is depicted the process of the trunked system infrastructure 250 receiving a message, and building its infrastructure memory.

The process starts, step 601, and then proceeds to step 603.

In step 603, the infrastructure receives a message from a first subscriber, thus forming a received message, the received message including a second subscriber's identification code and public key.

In step 605, the infrastructure authenticates the received message by a process similar to the infrastructure's process of authenticating a channel request as described above in the sequence of steps 405, 407, 409 and 411.

Next, the infrastructure 250 builds its infrastructure memory 255 by the sequence of steps 607 and 609.

In step 607, the infrastructure accesses the second subscriber's identification code and public key from the received message.

In step 609, the infrastructure stores the second subscriber's identification code and public key in its infrastructure memory 255.

The process ends, step 611.

Some advantages of a radio frequency communication system with subscribers arranged to authenticate a received message, in accordance with the present invention, are described as follows.

First, by arranging a trunked system infrastructure to authenticate a received channel request from a requesting subscriber in accordance with the present invention, the trunked system infrastructure can be sure of the identity of the requesting subscriber.

In contrast, existing trunked systems generally use only a subscriber identification code to verify the subscriber's identity and, as a result, a subscriber can easily be cloned. While existing systems use single-key encryption methods for verification purposes, these methods only verify that the requesting subscriber is a member of an authenticated group, and do not verify the exact identity of the subscriber in that group.

Second, by arranging a trunked system infrastructure to send a channel grant message to system subscribers, wherein the channel grant message includes the requesting subscriber's identification code and public key, in accordance with the present invention, the system subscribers are thereby enabled to authenticate each other.

In contrast, existing system subscribers authenticate received messages with a common key and, as a result, a subscriber receiving messages encoded with the common key cannot be sure of the exact identity of the transmitting subscriber. Thus, by using this single-key authentication method, the infrastructure and subscribers authenticate one another based on the assumption that the common key is used by a transmitting subscriber. However, if the common key is compromised, a subscriber can easily be programmed to use it and thus act as a clone in the system.

Third, by arranging trunked system subscribers to monitor a channel grant message and extract the requesting subscriber's identification code and public key from the channel grant message in accordance with the present invention, a monitoring subscriber thus acquires the public key needed to authenticate subsequent messages from the requesting subscriber at the exact time when the public key is needed. This is because the key is provided in the grant which immediately precedes transmissions from the requesting subscriber. As a result, subscribers aren't required to store lots of public keys which may never be needed.

Fourth, by arranging subscribers to communicate and authenticate messages that contain public keys for other subscribers, in accordance with the present invention, subscribers are thus enabled to exchange keys for other subscribers between each other in a secured and controlled manner.

Fifth, if a subscriber arranged in accordance with the present invention is stolen, the corresponding public key for the stolen subscriber can easily be nullified to prevent access to the trunked system, and this nullification information can quickly be distributed to other system subscribers. In contrast, if an existing single-key system subscriber is stolen, the corresponding single system key can be used to access the system and, as a result, all subscribers must be reprogrammed with a new system key.

While various embodiments of a radio frequency communication system with subscribers arranged to authenticate a received message, in accordance with the present invention, have been described hereinabove, the scope of the invention is defined by the following claims.

I claim:

1. A trunked radio frequency communication system including a trunked system infrastructure and a plurality of subscribers, each subscriber of the plurality of subscribers having an identification code, a public key and a private key, the trunked system infrastructure including an infrastructure memory and arranged for storing identification codes and public keys for various subscribers of the plurality of subscribers in the infrastructure memory, the trunked system infrastructure arranged for receiving a channel request from a requesting subscriber of the plurality of subscribers, thus forming a received channel request, the received channel request including the requesting subscriber's identification code, and for authenticating the received channel request by accessing the requesting subscriber's identification code from the received channel request, retrieving the requesting subscriber's public key from the infrastructure memory, thus forming a retrieved key, and decoding the received channel request with the retrieved key.

2. The trunked radio frequency communication system of claim 1, the trunked system infrastructure further arranged for sending a channel grant message to the plurality of subscribers, the channel grant message including the requesting subscriber's identification code and public key.

3. The trunked radio frequency communication system of claim 2, each subscriber of the plurality of subscribers including a subscriber memory and arranged for receiving the channel grant message and for building the subscriber memory by accessing the requesting subscriber's identification code and public key from the channel grant message and storing the requesting subscriber's identification code and public key in the subscriber memory.

4. A subscriber arranged for communicating in the trunked radio frequency communication system of claim 1, the subscriber comprising a memory and arranged for storing identification codes and public keys for at least one of the plurality of subscribers in the memory.

5. The subscriber of claim 4, further arranged for receiving a channel grant message from the trunked system infrastructure, thus forming a received channel grant message, the received channel grant message including a requesting subscriber's identification code and public key.

6. The subscriber of claim 5, further arranged for building the subscriber memory by accessing the requesting subscriber's identification code and public key from the received channel grant message and storing the requesting subscriber's identification code and public key in the subscriber memory.

7. The subscriber of claim 1, the received message including a third subscriber's identification code and public key.

8. A trunked system infrastructure arranged to function with a trunked radio frequency communication system, the trunked radio frequency communication system including a plurality of subscribers, each subscriber of the plurality of subscribers having an identification code, a public key and a private key, the trunked system infrastructure including an infrastructure memory and arranged for storing identification codes and public keys for various subscribers of the plurality of subscribers in the infrastructure memory, the trunked system infrastructure arranged for receiving a channel request from a requesting subscriber of the plurality of subscribers, thus forming a received channel request, the received channel request including the requesting subscriber's identification code, and for authenticating the received channel request by accessing the requesting subscriber's identification code from the received channel request, retrieving the requesting subscriber's public key from the infrastructure memory, thus forming a retrieved key, and decoding the received channel request with the retrieved key.

9. The trunked system infrastructure of claim 8, further arranged for sending a channel grant message to the plurality of subscribers, the channel grant message including the requesting subscriber's identification code and public key.

10. A trunked radio frequency communication system including a trunked system infrastructure and a plurality of subscribers, each subscriber of the plurality of subscribers having an identification code, a public key and a private key, the trunked system infrastructure including an infrastructure memory and arranged for storing identification codes and public keys for various subscribers of the plurality of subscribers in the infrastructure memory, the trunked system infrastructure arranged for receiving a message from a first subscriber of the plurality of subscribers, thus forming a received message, the received message including a second subscriber's identification code and public key, and for building the infrastructure memory by accessing the second subscriber's identification code and public key from the received message and storing the second subscriber's identification code and public key in the infrastructure memory.

11. A subscriber arranged for communicating in the trunked radio frequency communication system of claim 10, the subscriber comprising a memory and arranged for storing identification codes and public keys for at least one of the plurality of subscribers in the memory.

12. The subscriber of claim 11, further arranged for receiving a channel grant message from the trunked system infrastructure, thus forming a received channel grant message, the received channel grant message including a requesting subscriber's identification code and public key.

13. The subscriber of claim 12, further arranged for building the subscriber memory by accessing the requesting subscriber's identification code and public key from the received channel grant message and storing the requesting subscriber's identification code and public key in the subscriber memory.

14. The subscriber of claim 10, the received message including a third subscriber's identification code and public key.

15. The subscriber of claim 14, further arranged for building the memory by accessing the third subscriber's identification code and public key from the received message and storing the third subscriber's identification code and public key in the subscriber memory.

16. The subscriber of claim 15, further arranged for building the memory by accessing the third subscriber's identification code and public key from the received message and storing the third subscriber's identification code and public key in the subscriber memory.

* * * * *